United States Patent [19]

Tinsley et al.

[11] 4,360,186

[45] Nov. 23, 1982

[54] SWIVEL JOINT

[76] Inventors: William B. Tinsley, 1926 Colony Dr.;
C. Richard Bacon, 2102 Vanco Dr.,
both of Irving, Tex. 75061

[21] Appl. No.: 205,096

[22] Filed: Nov. 10, 1980

[51] Int. Cl.$^3$ .................. E21B 33/06; E16L 27/06
[52] U.S. Cl. ......................... 251/1 B; 277/111;
285/94; 285/269; 285/349; 285/351; 285/89;
285/279; 285/341
[58] Field of Search ............... 285/94, 89, 279, 267,
285/268, 269, 341, 349, 351; 277/30, 110, 111,
117, 119; 251/1 R, 1 A, 1 B

[56] References Cited

U.S. PATENT DOCUMENTS

| | | | |
|---|---|---|---|
| 1,522,226 | 1/1925 | Bowles | 285/94 X |
| 1,877,696 | 9/1932 | Schellack et al. | 277/110 X |
| 1,917,742 | 7/1933 | Tinsley | 285/268 |
| 2,175,752 | 10/1939 | Gray | 285/269 X |
| 2,361,811 | 10/1944 | Badger | 285/268 X |
| 2,427,456 | 9/1947 | Hoy | 285/94 X |
| 2,480,055 | 8/1949 | Seaton | 285/94 X |
| 2,628,112 | 2/1953 | Hebard | 285/94 X |
| 3,477,748 | 11/1967 | Tinsley | 285/267 |

Primary Examiner—Dave W. Arola
Attorney, Agent, or Firm—Ranseler O. Wyatt

[57] ABSTRACT

A Swivel Joint for use on producing wells which are being pumped, having an upper and a lower annular member, in juxtaposition, with a coil spring separating the members, the lower member having a curved external face to receive, in line contact, the inside wall of the retaining member, which is engaged with the upper member, and having a packing chamber and a packing nut having one end extending into said packing chamber, and a grease chamber in said packing nut, and packing members mounted in said packing chamber compressed by one end of said packing nut. A blow out preventer is mounted on the lower member having a collapsible packing retainer in which a flexible packing is mounted, said retainer being maintained normally in inactive position, with means for moving said packing into active position to seal off the annulus between the sucker rod and the inside wall of the lower annular member to permit repacking of the packing gland, or to act as a blowout preventer, said packing retainer retracting the packing material when the activating means is moved to inactive position.

5 Claims, 2 Drawing Figures

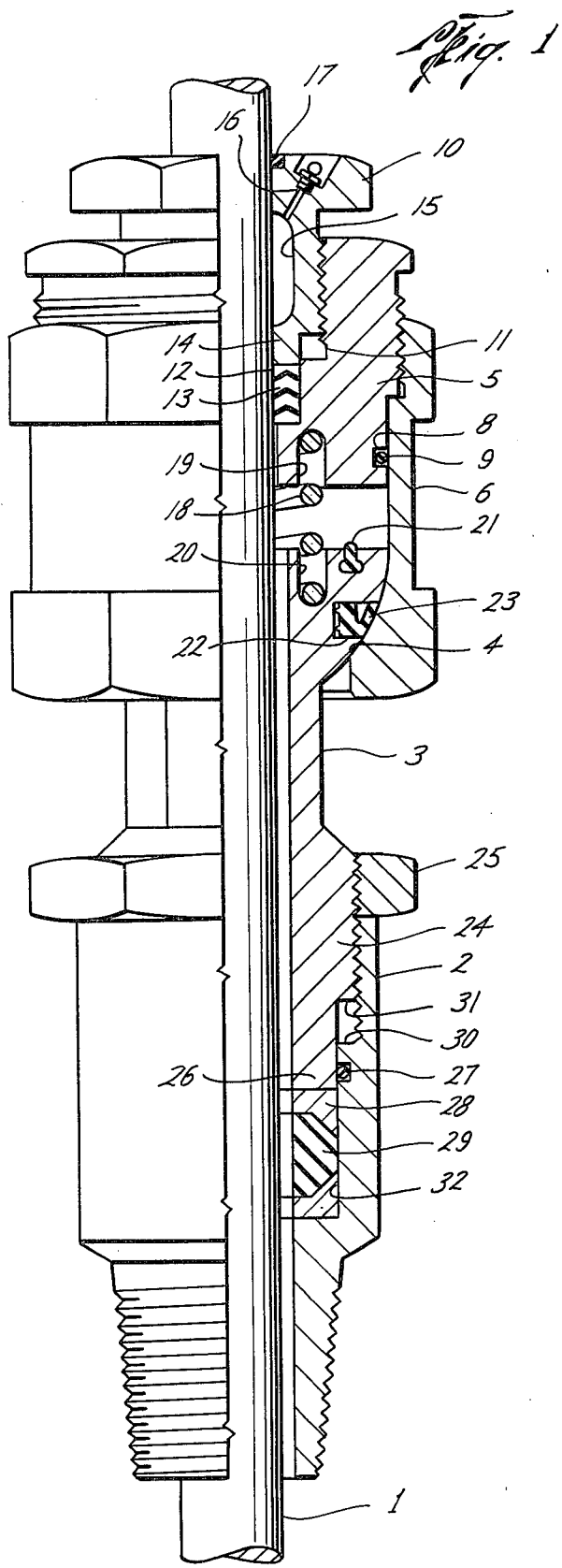
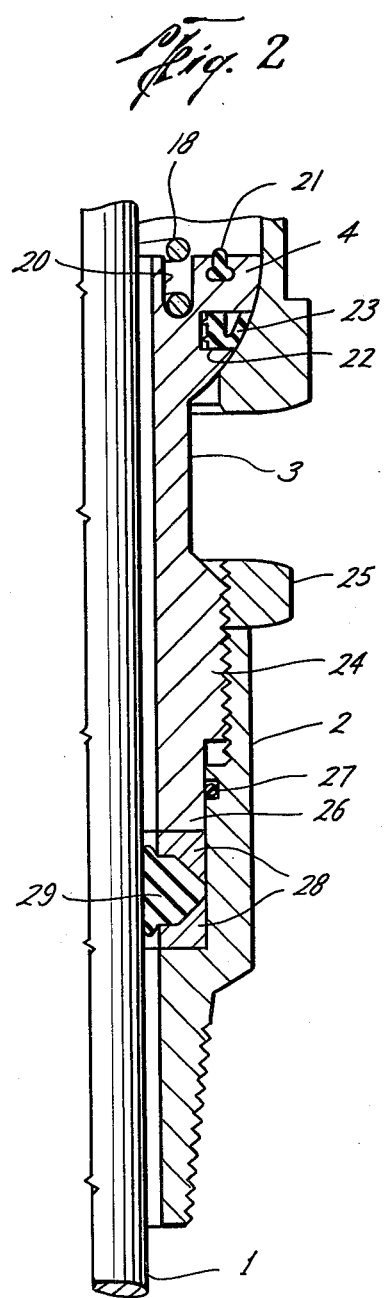

SWIVEL JOINT

BACKGROUND OF THE INVENTION

This swivel joint is a modified form of the swivel joint disclosed in U.S. Pat. No. 3,447,748, issued to one of the applicants herein. The disclosure in said patent consisted of spring loaded bolts to maintain the swivel joint during pumping operations. These joined the two working parts of the joint and were located on the outside of the joint. The members of the joint were maintained in sealing position by the tension on the springs on the bolts. A pump sucker rod recprocates through the joint, and the upper member rocks on the lower member to compensate for the lateral movement of the sucker rod. It was found to maintain proper lubrication of the sucker rod as it reciprocated through said joint, various types of wiping means were employed, requiring attention, and usually causing spills of lubricant at the well head. With this objection in mind, applicants sought a better pressure maintaining means to keep the joint sealed, and sought a better lubrication system as well as a means of repacking the joint while installed on a well head, and with the same means, providing a blowout preventer. While most users of this device were encountering no, or very little, gas pressure, it was necessary to have some type of protection against blowouts. A simple, inexpensive preventer was needed. Applicants' packing in a collapsible retainer and means for moving against the retainer to expand the packing against the sucker rod, filled this need, as well as provided means for closing off the flow of production fluid from the well while the repacking in the packing chamber is accomplished.

SUMMARY OF THE INVENTION

A swivel joint having upper and lower contiguous annular members having opposing flat faces, a coil spring maintaining said members separated from each other and exposing the flat faces thereof to the well pressure to assist the spring in urging the members apart, and maintaining a sealed joint and a packing gland is formed in the upper member in which suitable packing is mounted, and a packing nut, having a grease chamber formed therein, bears against said packing in said packing gland, lubricating the reciprocating sucker rod, and having a well seal and blowout preventer consisting of a collapsible packing retainer mounted adjacent the extended end of the lower annular member containing a packing movable against the sucker rod extending through said annular members to seal the annulus between the sucker rod and the inside wall of said annular members to permit replacing the packing in the packing gland and to be utilized as a blowout preventer.

BRIEF DESCRIPTION OF THE DRAWING

FIG. 1 is an elevational view, partially in cross section, showing a sucker rod extending through the annular members, and FIG. 2 is an elevational view, partially in cross section, of the lower portion of the device, illustrating the blowout preventer in sealing position.

DESCRIPTION OF THE PREFERRED EMBODIMENT

In the drawing, the numeral 1 designates a sucker rod assembly as is used in pumping wells, the pump jack (not shown) being immediately above this assembly, and the blowout preventer nipple 2 being mounted in the usual well head T (not shown). A lower annular member 3, having a curved shoulder 4 is arranged in juxtaposition with the upper annular member 5 and maintained in position by means of the coupling 6 which has the curved inside wall at its lower end in line contact with the curved outside wall of the lower annular member and is internally threaded at its upper end to receive the external threads of the upper annular member. An o-ring groove 8 is formed in the external wall of the upper annular member in which an o-ring 9 is mounted to seal the upper annular member and the inside walls of the upper annular member 5 is enlarged at 11, adjacent its upper end, and internally threaded to receive the packing nut 10. A packing gland consisting of the chamber 12, and packing therein, is formed in the inside wall of the upper annular member 5 to receive suitable rings of packing. This forms the usual stuffing box to receive the sucker rod which extends into the well being pumped. A nut 10 is externally threaded to be received by the internal threads of the upper annular member 5, and is externally reduced diametrically to form a projection 14 on its lower end, adapted to bear against the packing 13 in the chamber 12. A grease chamber 15 is formed in the inside wall of the nut 10, and a grease fitting 16 leads into said chamber. A packing ring 17 is mounted in the bore of the nut 10.

A coil spring 18 is seated at each end in the respective spring receiving grooves 19, 20 in the upper and lower annular members. The respective faces of the upper and lower annular members are opposed, flat and a flexible packing ring 21 is mounted in the upper face of the lower annular member to prevent leakage in the event the line contact, between the curved shoulder 4 and the inside wall of the coupling 6, seal is broken, and the faces of the upper and lower members move in contact with each other. A groove 22 formed in the curved wall of the lower annular member, having packing as 23, normally seals the joint.

The lower annular member is externally expanded and threaded to form the lateral projection 24 to receive the upper end of the nipple 2, and to receive a lock nut 25 for maintaining the nipple and lower annular member in position. The inside wall of the nipple 2 is internally threaded, and internally reduced in diameter, forming the shoulder 30. The member 3 is reduced beneath the projection 24, forming a projection 26, and the nipple 2 is internally reduced forming the packing chamber 32. An o-ring packing 27 bears against the outside wall of the projection 26 and is mounted in a groove in the inside wall of the nipple 2. A collapsible packing retainer 28 is seated in the chamber 32 of the nipple 2, and a flexible packing 29 is mounted in said retainer 28.

With the device mounted on a sucker rod assembly, the sucker rod will be lubricated by means of the grease in the grease chamber in the packing nut 10 as the sucker rod is reciprocated during pumping operations, and the spring 18 will maintain the upper and lower members apart, and the pressure of the production fluid coming up through the annulus between the sucker rod and the lower annular member 3, will assist in maintaining these members apart by applying pressure to the abutting faces of the upper and lower members, and the upper annular member may rock relative to the lower member with the reciprocation of the sucker rod assembly, maintaining the stuffing box in alignment with the sucker rod during pumping operations. The pumping action is for use in wells that do not have sufficient pressure to flow unaided, so that if the pressure against the flat face of the upper and lower members is great enough to freeze the swivel joint, it will be great enough to produce without the pump. In the event of pressure of such magnitude, or in the event a blowout is threatened, the lock nut 25 is backed off far enough to permit the member 2 to be rotated, moving the projection 26 against the packing retainer 28, collapsing same, and causing the packing 29 to expand against the sucker rod 1 and sealing against a blowout. This seal may also be utilized to permit repacking of the packing chamber, in which event the nut 25 is backed off and the packing retainer collapsed to move the packing against the sucker rod, and when the repacking of the packing chamber has been accomplished, the member 3 is rotated to raise the projection 26 off of the packing retainer 28, and permitting the packing to return to its original position in the retainer, off of the sucker rod, and permitting a return of a flow of well fluid into the area between the flat faces of the upper and lower annular members. The locking nut is again rotated to retain the nipple on the lower member, and to maintain the blowout preventer in inactive position.

What we claim is:

1. In a swivel joint for use in pumping wells, an upper and lower annular member, each having a face thereon, connecting means for connecting said members with said faces opposed to each other and maintaining said members in position on a well head, said upper and lower annular members and connecting means having aligned bores extending therethrough in which a sucker rod is positioned for reciprocation, said bores and sucker rod defining an annulus therebetween, said upper member having packing means sealing the annulus between the sucker rod and the upper member, the upper portion of the lower annular member having an external curved surface and the internal wall of the connecting means being internally curved forming a line contact with said externally curved surface of said lower annular member, a yieldable means mounted in the respective opposed faces of the upper and lower annular members constantly urging said members apart and the annulus between the sucker rod and the lower member admitting a flow of production fluid under pressure into the area between said opposed faces to assist in maintaining said annular members in spaced relationship.

2. The device defined in claim 1 wherein said lower annular member has a blowout preventer for blocking passage of production fluid upwardly through the sucker rod-lower annular member annulus, consisting of a sealing means normally maintained out of contact with the sucker rod and selectively movable into sealing relation with said sucker rod extending therethrough.

3. The device defined in claim 1 wherein said lower annular member has a laterally extending projection externally threaded to receive a nipple and a nipple mounted on said lower annular member having a packing chamber, a collapsible packing retainer and packing mounted in said packing chamber and normally maintained out of contact with said sucker rod, a downwardly extending projection on said lower annular member adapted to selectively contact said packing retainer and to move against said retainer and to collapse same and move said packing into expanded position and in contact with said sucker rod.

4. The device defined in claim 1 wherein said packing means on said upper annular member includes a packing chamber, packing in said packing chamber, sealing the annulus between said sucker rod and upper annular member, a nut mounted in the upper annular member having a grease chamber formed therein, grease in said chamber to lubricate said sucker rod, and having the lower end of said nut reduced forming a projection bearing against said packing in said packing chamber.

5. The device defined in claim 1 wherein said lower annular member has a blowout preventer, consisting of a collapsible packing retainer mounted in said lower annular member, a flexible packing in said packing retainer normally maintained out of contact with the sucker rod, means on said lower member for selectively expanding and contracting said flexible packing to open and close the annulus between said sucker rod and lower member.

* * * * *